(12) United States Patent   (10) Patent No.: US 6,560,712 B1
Arends et al.              (45) Date of Patent:    May 6, 2003

(54) BUS ARBITRATION IN LOW POWER SYSTEM

(75) Inventors: John H. Arends, Austin, TX (US);
William C. Moyer, Dripping Springs, TX (US); Steven L. Schwartz, Round Rock, TX (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/440,857

(22) Filed: Nov. 16, 1999

(51) Int. Cl.⁷ .............................. G06F 1/32; G06F 13/36
(52) U.S. Cl. ....................... 713/320; 710/241; 710/309
(58) Field of Search .......................... 713/320; 710/241, 710/309, 100, 107

(56) References Cited

U.S. PATENT DOCUMENTS

| | | | |
|---|---|---|---|
| 5,455,912 A | | 10/1995 | Ludwig ....................... 395/293 |
| 5,590,341 A | * | 12/1996 | Matter ........................ 713/320 |
| 5,652,895 A | | 7/1997 | Poisner ....................... 395/750 |
| 5,677,849 A | | 10/1997 | Smith ......................... 364/492 |
| 5,875,348 A | * | 2/1999 | Matsushima et al. ......... 710/14 |
| 5,898,879 A | | 4/1999 | Kim ....................... 395/750.04 |
| 6,052,774 A | * | 4/2000 | Segars et al. ................ 712/200 |
| 6,085,330 A | * | 7/2000 | Hewitt et al. ............... 713/322 |
| 6,161,186 A | * | 12/2000 | Smith ......................... 713/320 |
| 6,243,817 B1 | * | 6/2001 | Melo et al. .................. 713/300 |
| 6,324,684 B1 | * | 11/2001 | Matt et al. .................. 717/124 |

* cited by examiner

Primary Examiner—Thomas Lee
Assistant Examiner—Eric Chang
(74) Attorney, Agent, or Firm—Joanna G. Chiu

(57) ABSTRACT

Power is conserved in a data processing system that includes a processor core and system circuitry coupled to the processor core. A first method for conserving power includes entering a low power state by the processor and the system circuitry and enabling bus arbitration by the processor while the processor core remains in the low power state. One embodiment further contemplates a method of conserving power by granting bus access to a requesting device and entering a power conservation mode by the processor core in response thereto. Bus operations are then performed while the processor core remains in the power conservation mode. Another embodiment contemplates a method of debugging a data processing system in which a debug state is entered by the processor and the system circuitry and, thereafter, bus arbitration is enabled by the processor while the processor core remains in the debug state.

22 Claims, 7 Drawing Sheets

BUS ARBITRATION IN LOW POWER SYSTEM

FIELD OF THE INVENTION

The present invention relates generally to the field of low power electronic systems and more particularly to a system capable of performing bus arbitration in a lower power state.

BACKGROUND OF THE INVENTION

Microprocessor designs routinely allow a bus to have multiple masters through a defined bus arbitration scheme. Typically, an external device will request ownership of the bus via a bus request signal. The external device is granted ownership by the arbitration block with the assertion of the bus grant output. Typically, the arbitration block is integrated on the same device as the microprocessor core. When the bus arbitration block grants the bus to an external master, the CPU cores are quickly stalled. When the cores are stalled, any power consumed by the core, and more specifically, by the core's clock tree is unnecessarily wasted. Therefore it would be desirable to implement a microprocessor with a bus arbitration block that eliminated unnecessary power consumption in the CPU core when an alternate bus master has been granted control of the system bus by the arbitration block. In addition, microprocessor designs typically accommodate a low power state and a debug state in addition to a normal operating state. In a conventional design, bus arbitration is prohibited when the processor is in either the debug state or the low power state. Therefore, it would be further desirable to implement a processor in which arbitration of the system bus could be accommodated independent of the operating state of the processor.

BRIEF DESCRIPTION OF THE DRAWINGS

The present invention is illustrated by way of example and not limitation in the accompanying figures, in which like references indicate similar elements, and in which.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments. of the present invention.

DETAILED DESCRIPTION OF THE FIGURES

As used herein, the term "bus" is used to refer to a plurality of signals or conductors which may be used to transfer one or more various types of information, such as data, addresses, control, or status. The terms "assert" and "negate" are used when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Figure 1:
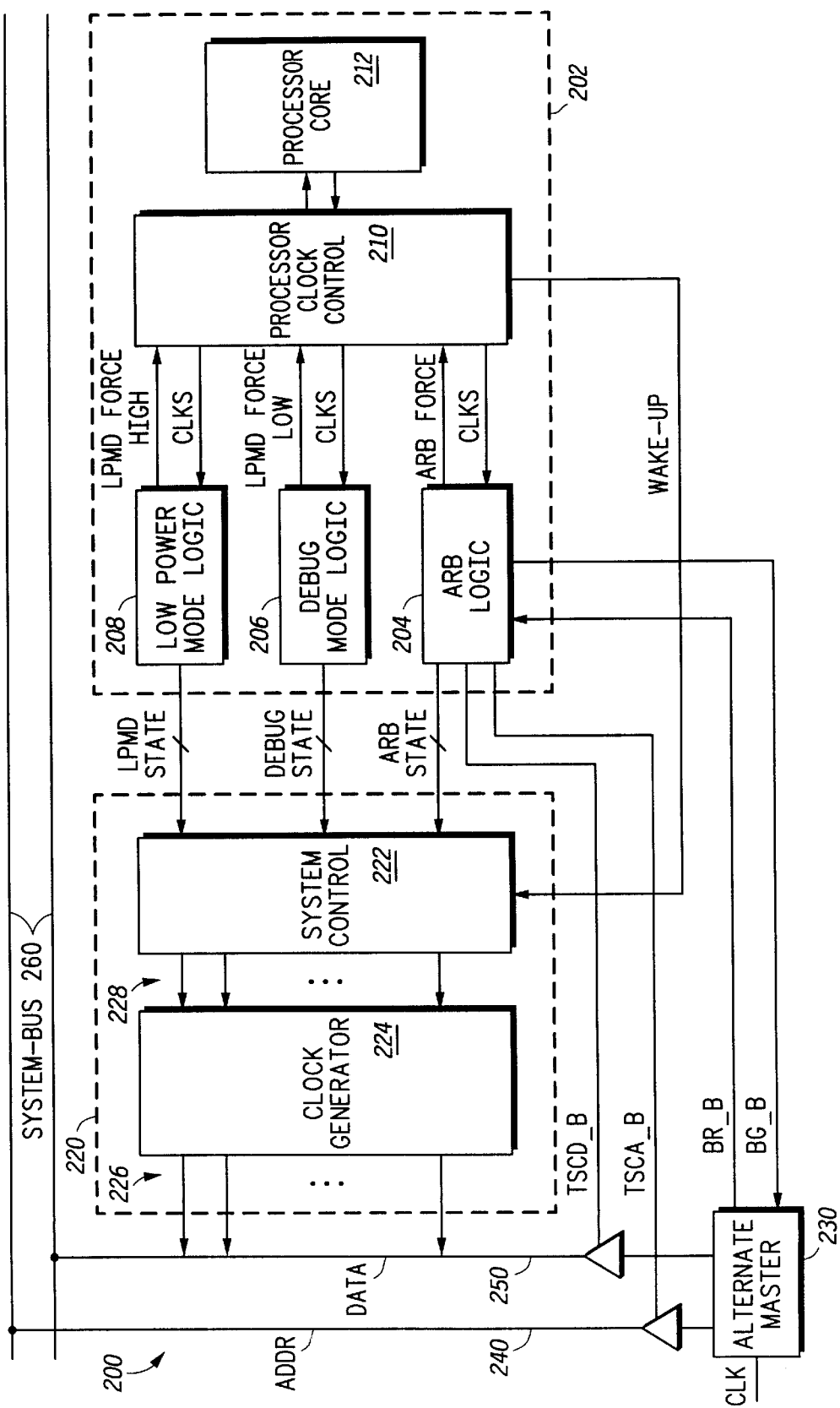
FIG. 1 is a block diagram of a system according to one embodiment of the present invention.

FIG. 1 is a simplified block diagram of a data processing system 200 according to one embodiment of the present invention. System 200 includes a central processing unit (processor) 202, a system clock controller 220, and an alternate master or bus requester 230. Clock controller 220 is configured to provide a clock signal to bus requester 230. Processor 202 includes a processor core 212 that contains the core functionality of processor 202 and a processor clock controller 210 that utilizes various input signals to control the clocking of processor core 212. Thus, data processing system 200 may be described as including a processor core 212 and system circuitry including system clock controller 220 that is coupled to processor core 212 through an intermediate processor clock controller 210.

Processor 202 further includes an arbitration unit (arbiter or Arb Logic) 204 coupled to processor clock controller 210 and system clock controller 220. Processor 202 further includes debug unit (debug mode logic) 206 and low power unit (low power mode logic) 208 that enable a debug state and low power state respectively in processor 202. Typically, the debug state and lower power state of processor 202 are mutually exclusive, such that processor 202 cannot simultaneously assume the debug state and the low power state. In response to various control signals from processor 202 which may be initiated by a software instruction, hardware interrupt, or other suitable mechanism, debug unit 206 is adapted to respond to these various input signals by providing debug state signals to a system control unit 222 in system clock controller 220. Similarly, low power unit 208 receives various signals from processor 202 and generates low power state signals (LPMD State) to system control unit 222. Based upon the signals received from low power unit 208, debug unit 206, and arbiter 204, system control unit 222 manipulates the inputs to a clock generator unit 224 to control the clock signals that are applied to various components of system 200. In addition, debug unit 206, low power unit 208, and arbiter 204 provide signals to processor clock controller 210. Processor clock controller 210 responds to these inputs by generating clock signals for processor core 212 appropriate to the low power state, debug state, and arbitration state of processor 202.

As indicated above, system 200 includes one or more bus requesters or alternate masters 230 (one of which is indicated in FIG. 1). Each alternate master 230 includes facilities for requesting ownership or mastership of a system bus 260. In one embodiment, an alternate master 230 requests mastership of system bus 260 by asserting a bus request signal (BR_B) that is routed to arbiter 204 of processor 202. Arbiter 204 is configured to generate a bus grant signal (BG_B) and provides the BG_B signal to alternate master 230. In the depicted embodiment, arbiter 204 is further responsible for granting alternate master 230 access to system bus 260 by asserting tri-state control signals TSCD_B and TSCA_B to enable data and address outputs from alternate master 230 to system bus 260.

Data processing system 200 according to one embodiment of the present invention is suitable for arbitrating control of system bus 260 independent of the operating state of processor 202. In addition, system 200 is optimized to reduce power consumption whenever an external master such as alternate master 230 shown in FIG. 1 has ownership of system bus 260. In this manner, the invention contemplates a bus arbitration system suitable for use in any system requiring a low power, low cost bus arbitration scheme. Embodiments of the invention are suitable for use in multiprocessing systems as well as in all systems that utilize hardware acceleration. Embodiments of the invention are capable of reducing power consumption of an inactive computer system with no significant degradation in restart or response time, and a minimal delay due to reinitiating from a low power state. Suitable applications for a processor with the facilities disclosed herein include a debug support application, DMA controller support, multiprocessing support, and hardware accelerators that require bus mastership. System 200 as depicted in FIG. 1 contemplates the separation of system clock control and processor clock control to optimize system power consumption and to enable system bus operations while a processor core remains in a special state such as a low power state or a debug state. System power is optimized by disabling circuitry including the clock tree circuitry of processor core 212 when processor 202 is in a low power state or has granted ownership of system bus 260 to an alternate master 230. System 200 further includes the ability to execute cycles on system bus 260 with an alternate master 230 when processor 202 is in a debug state.

Figure 2:
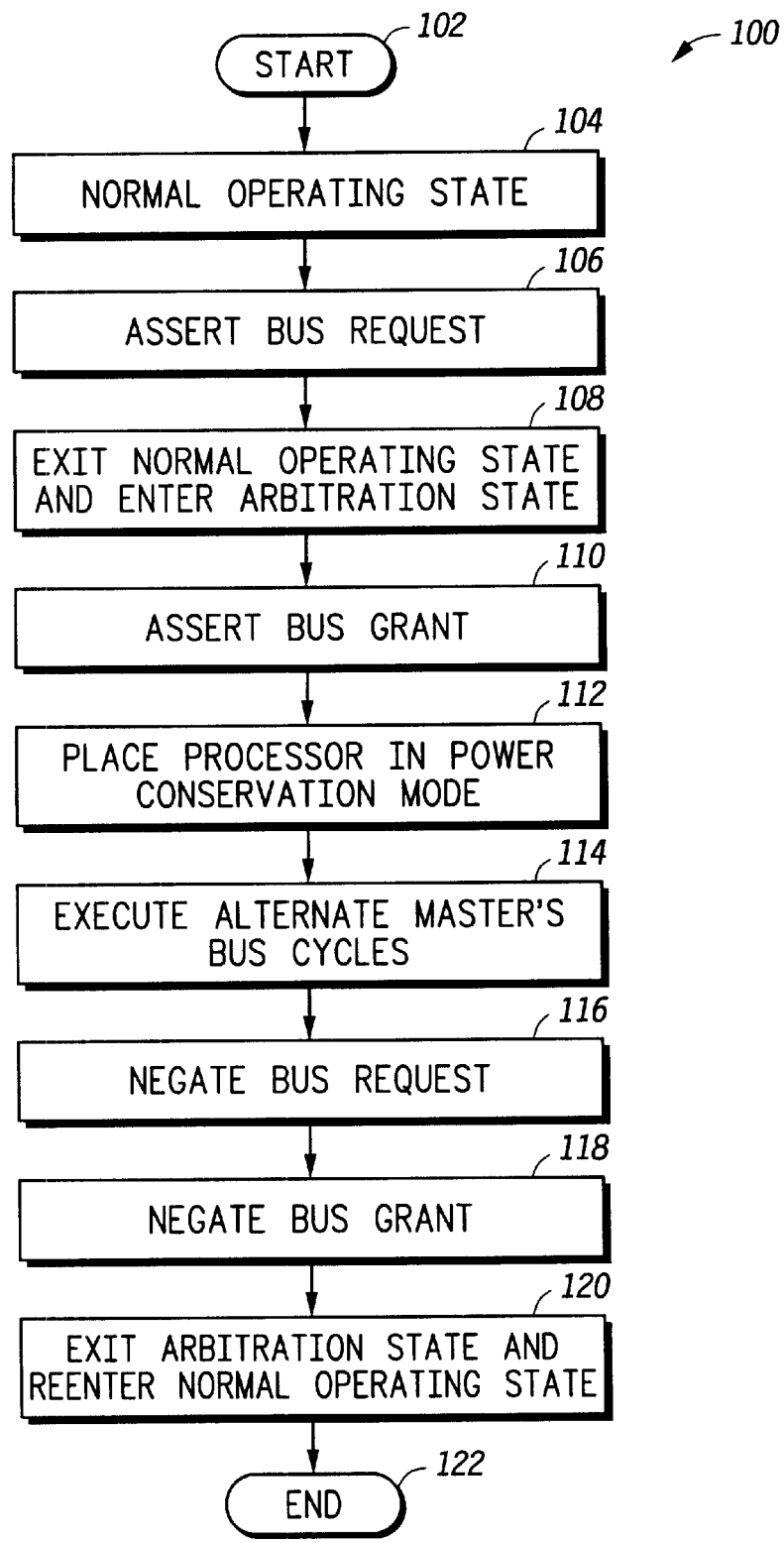
FIG. 2 is a flow diagram of a method of arbitrating a system bus while minimizing power consumption according to one embodiment of the invention.
Figure 5:
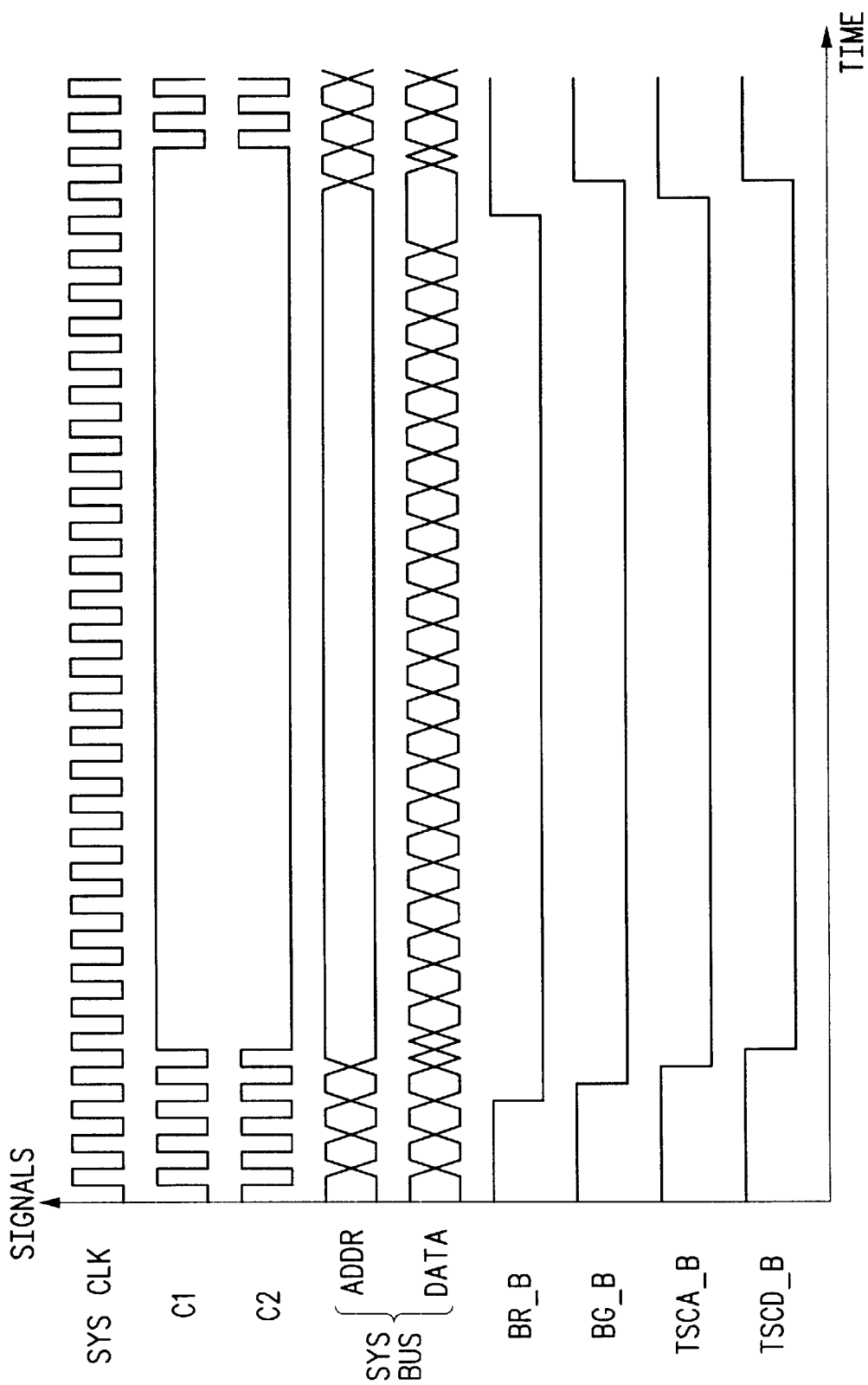
FIG. 5 is a timing diagram illustrating operation of the method of FIG. 2.

Turning now to FIG. 2, a flow diagram is presented emphasizing bus request handling in processor 202 to advantageously reduce processor 202 power consumption. The flow diagram of FIG. 2 is described in conjunction with the timing diagram of FIG. 5 illustrating selected signals in data processing system 200. With reference now to FIG. 2, an embodiment of the present invention contemplates a method 100 of conserving power in system 200 by transitioning processor core 212 to a power conservation mode when a bus request by bus requester 230 is granted. In one embodiment, method 100 is most suitably utilized when processor 202 is operating in its "normal" mode of operation (i.e., not debug mode and not low power mode). Thus, the flow diagram of FIG. 2 initially indicates processor 202 in a normal operating state in block 104. In block 106, ownership of the system bus 260 is requested by an alternate bus master such as bus requester 230. In one embodiment, alternate bus master 230 requests ownership of the system bus by asserting a bus request signal indicated in FIG. 5 by the negative transition of the BR_B signal that is received by arbiter 204. In response to the bus request, arbiter 204 causes processor 202 to exit its normal operating state and enter an arbitration state in block 108.

In this arbitration state, arbiter 204 asserts a bus grant signal BG_B in step 110 that is returned to alternate bus master 230. In addition, the embodiment of processor 202 depicted in FIG. 1 asserts tri-state control signals TSCD_B and TSCA_B that enable alternate master 230 to drive data signals 250 and address signals 240 to system bus 260. Upon issuing the BG_B signal, arbiter 204 signals processor clock controller 210 to place processor core 212 in a power conservation mode (block 112) by halting the core clocks (indicated in FIG. 5 by signals C1 and C2), thereby disabling the processor core circuitry and beneficially reducing overall power consumed by processor 202. During the time the bus grant signal BG_B remains asserted, the C1 clock to processor core 212 remains in a high state (and the C2 clock remains halted in a low state). The independently controlled system clocks, however, are enabled thereby permitting alternate bus master 230 to execute transactions on system bus 260 (block 114) as indicated in FIG. 5 by the system bus address and data signal transitions that occur while BG_B is asserted. When alternate master 230 has completed its system bus tasks, the alternate master 230 negates the BR_B signal (block 116). In response, arbitration logic 204 of processor 202 negates the tri state control signals TSCD_B and TSCA_B and the bus grant signal BG_B (block 118). When the BG_B signal is negated, processor clock control circuit 210 activates clock signals C1 and C2, thereby exiting the arbitration state (block 120) and reentering normal operating state. By effectively shutting down the processor core 212 when an alternate bus master 230 controls system bus 260, processor 202 according to this embodiment of the invention beneficially reduces power consumption during times when the processor core is effectively inactive.

Figure 3:
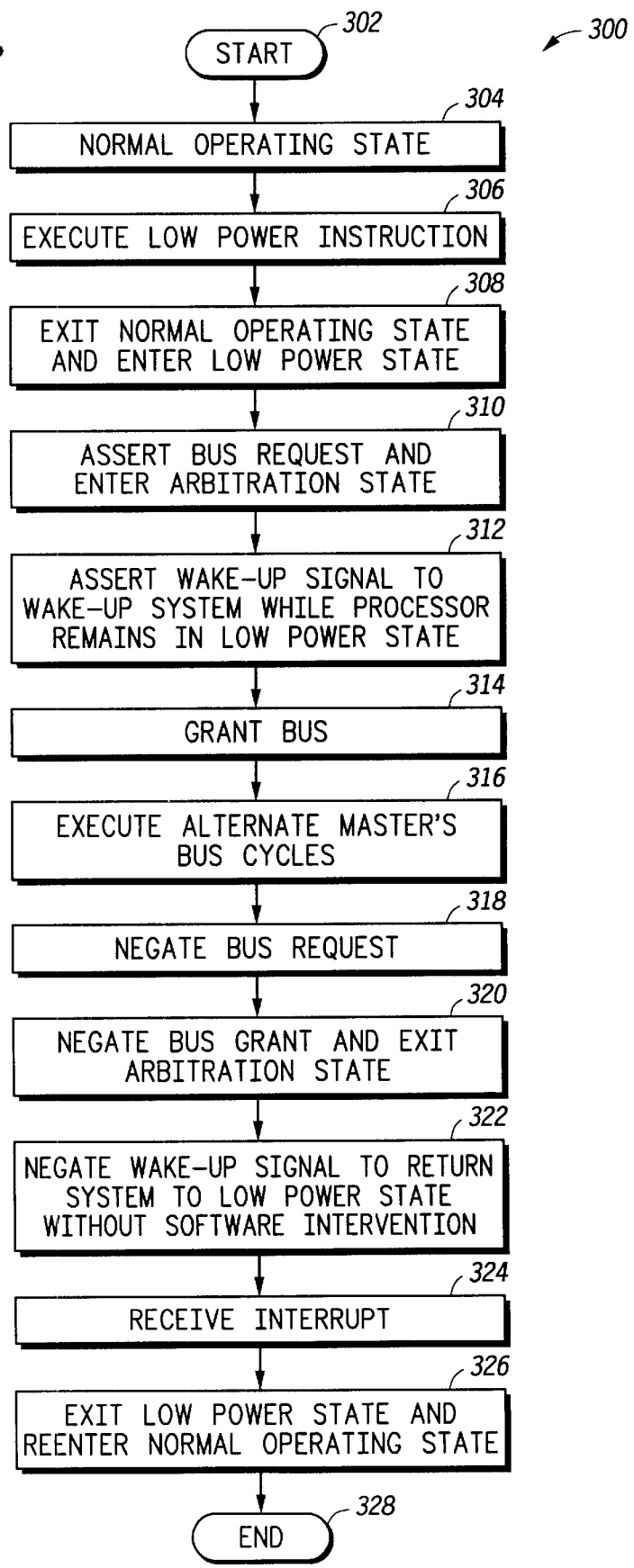
FIG. 3 is a flow diagram of a method of arbitrating a system bus in a low power state according to one embodiment of the invention.
Figure 6:
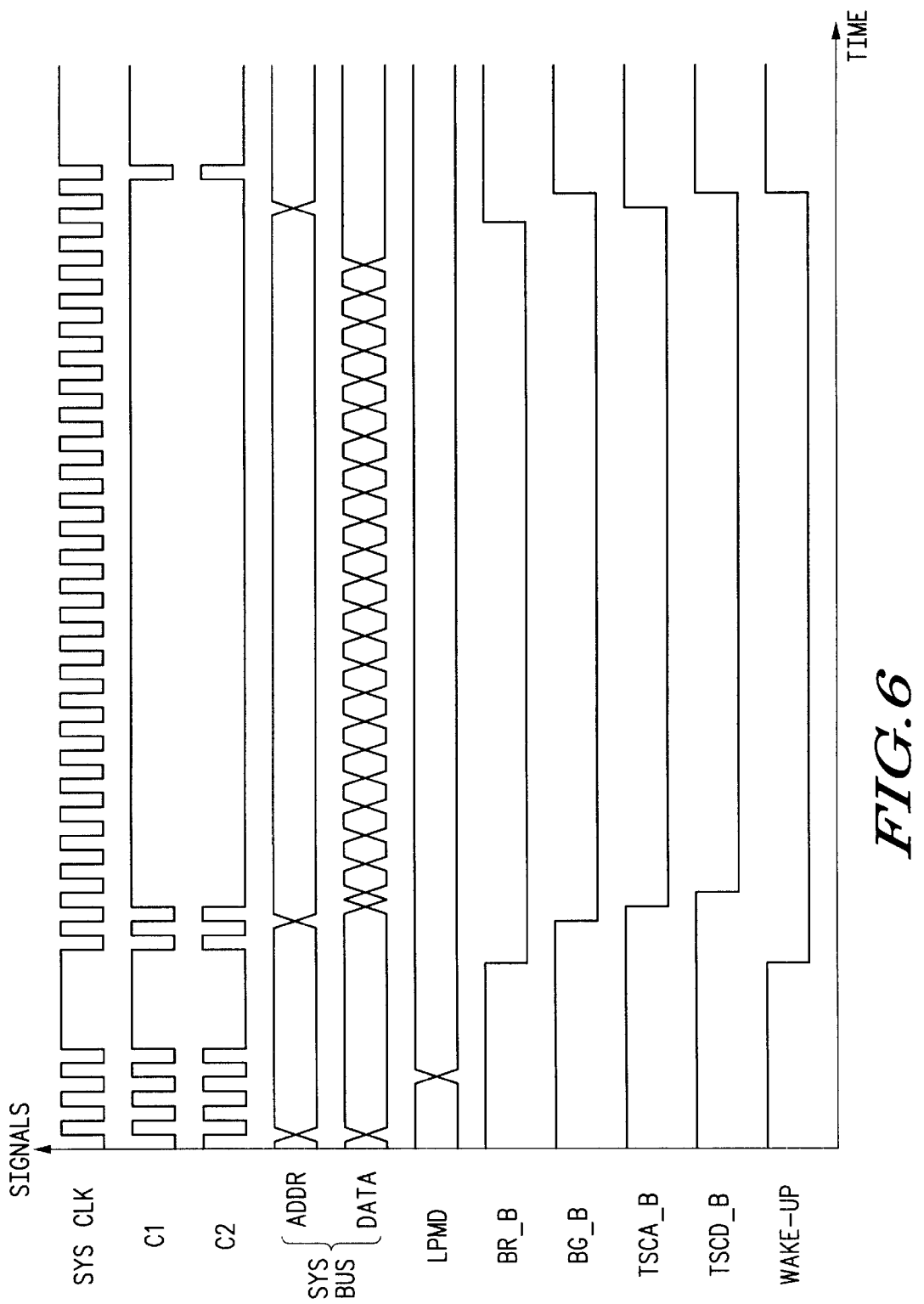
FIG. 6 is a diagram illustrating operation of the method of FIG. 3.

Turning now to FIGS. 3 and 6, a flow diagram and timing diagram are presented illustrating operation of data processing system 200 and processor 202 emphasizing the handling of external bus requests when processor 202 is in a low power state. The flow diagram of FIG. 3 illustrates a method 300 of conserving power in data processing system 200 by enabling bus arbitration while processor core 212 remains in a lower power state. Initially, processor 202 is operating in a normal operating state as indicated by reference numeral 304 in FIG. 3. Processor 202 is operable to enter a low power mode by supplying an appropriate input to low power mode logic 208. In one embodiment, low power mode may be initiated by issuing a low power mode command to low power mode unit 208. The illustrated embodiment of processor 202 includes a low power mode signal output indicated in FIG. 6 by the LPMD signal. In one embodiment, the LPMD signal is a 2-bit signal suitable for indicating one of four power modes, including a low power mode.

In the flow diagram of FIG. 3, a low power instruction is executed (block 306) that causes low power mode unit 208 to transition processor 202 from normal operating processor mode to a low power state (block 308). The low power state is indicated by the transition of the LPMD signal (from a value of 3 for normal operating mode to a value of 0 for low power mode according to one embodiment) followed in the timing diagrams of FIG. 6 by SYS CLK, C1 clock, and C2 clock entering a static condition. The static C1 clock effectively shuts down processor core 212 while the static SYS CLK shuts down the remaining components of data processing system 200. Some time after entering low power mode, the bus request signal BR_B is asserted in block 310 of FIG. 3 by a bus requester 230. The bus request signal BR_B is received by arbiter 204, which causes processor 202 to enter an arbitration state in block 310. Note that the arbitration state and the low power state are not mutually exclusive in that processor 202 can enter the arbitration state while remaining in the low power state. The arbiter 204 sends an arbitration signal to processor clock controller 210, in response to receiving the bus request signal BR_B. When the arbitration signal is detected by processor clock controller 210 while processor 202 is in a low power state, the arbitration signal causes the assertion of a WAKE-UP signal by processor clock controller 210 in block 312. The WAKE-UP signal is routed to system control unit 222 of system clock controller 220.

The WAKE-UP signal causes system control unit 222 to activate the system clock, thereby waking up the system and turning on the processor core clocks (i.e., the C1 clock and the C2 clock) for a duration just sufficient to enable arbitration logic 204 to generate a bus grant signal BG_B in block 314 of FIG. 3 without requiring processor 202 to exit the low power mode. (Note that the state of the LPMD signal does not change during the wake up sequence indicated in FIG. 6 by two cycles of processor clock signals C1 and C2 following the assertion of the WAKE-UP signal). In this manner, the WAKE-UP signal provided by processor clock controller 210 enables bus arbitration while the processor core remains in a low power state.

After bus grant signal BG_B is asserted, the C1 clock returns to a static high state (and C2 to a static low state) to minimize power consumption during the time that the alternate bus master is executing bus cycles in block 316. When the alternate master has completed its external bus cycles, the bus request signal BR_B is negated in block 318. In response, arbiter 204 negates the bus grant signal BG_B in block 320. When the bus grant signal BG_B is negated, processor exits the arbitration state. In block 322, the WAKE-UP signal is negated in response to the negation of the bus grant signal BG_B to return data processing system 200 to the low power state. Preferably, the WAKE-UP signal is not negated until the TSCD_B signal is also negated to ensure that system clocks continue to run through the termination of the alternate master's bus transaction period. The transition from the arbitration state to the low power state is indicated in the timing diagram of FIG. 6 by the transition of the system clock to a high state following negation of the WAKE-UP signal. In the preferred embodiment, the transition from the arbitration state to the low power state is achieved entirely in the hardware design of processor 202. Thus, software intervention is not required to return processor 202 and system 200 to the low power state following the external bus cycles.

After returning to low power state in block 322, an interrupt may be received in block 324 to transition system 200 from the low power state to the normal operating state in block 326. Preferably, if an interrupt is asserted during the interval when alternate bus master 230 has ownership of system bus 260, the interrupt is not serviced until the processor core 202 regains ownership of the bus after the negation of bus grant in block 320. During the alternate bus master cycles, the clocks C1 and C2 of processor core 202 are held high and low respectively to eliminate any glitching on the core blocks and to eliminate speed paths that could result if termination is received on a clock rising edge for the final bus transaction. In addition, holding the C1 clock in a high state allows interrupts to propagate through the interrupt controller which will wake up the processor core 212.

Figure 4:
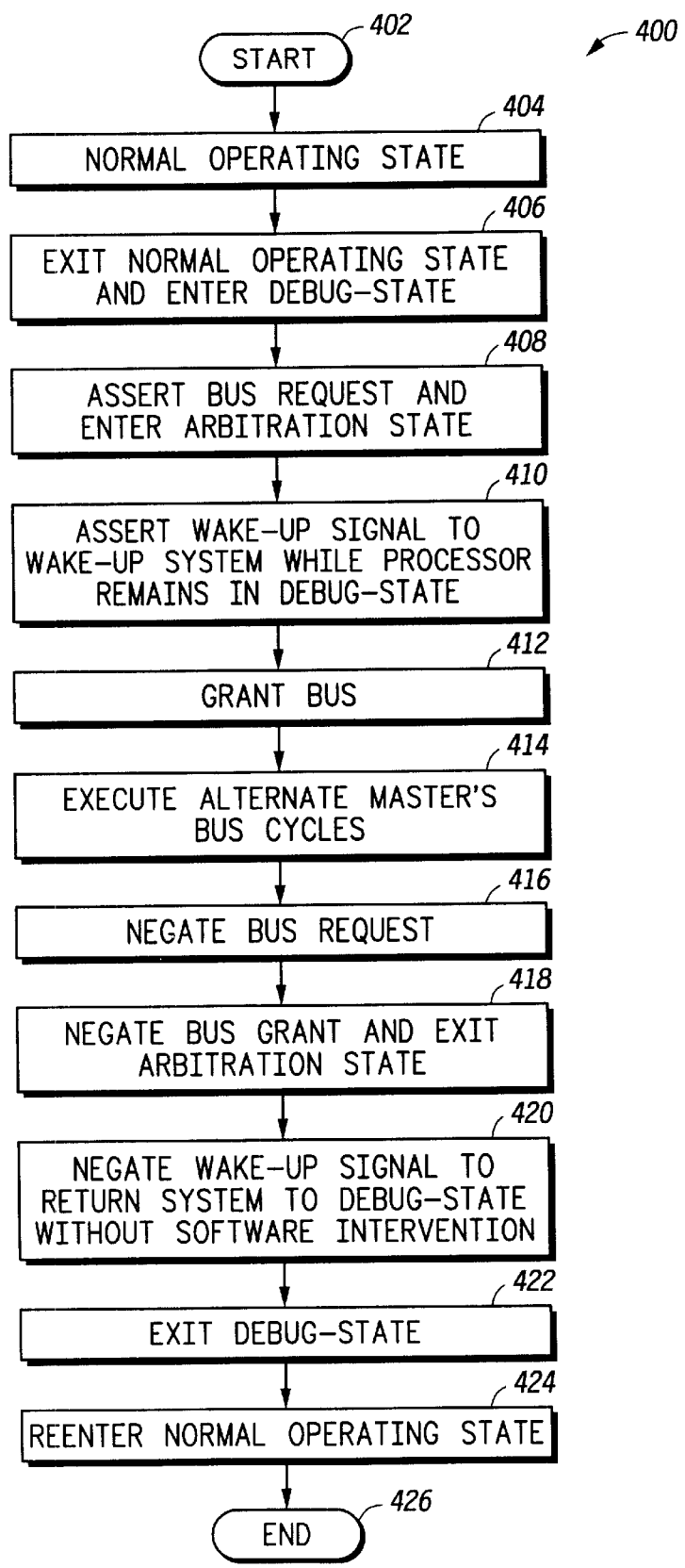
FIG. 4 is a flow diagram of a method of arbitrating a system bus in a debug state according to one embodiment of the invention.
Figure 7:
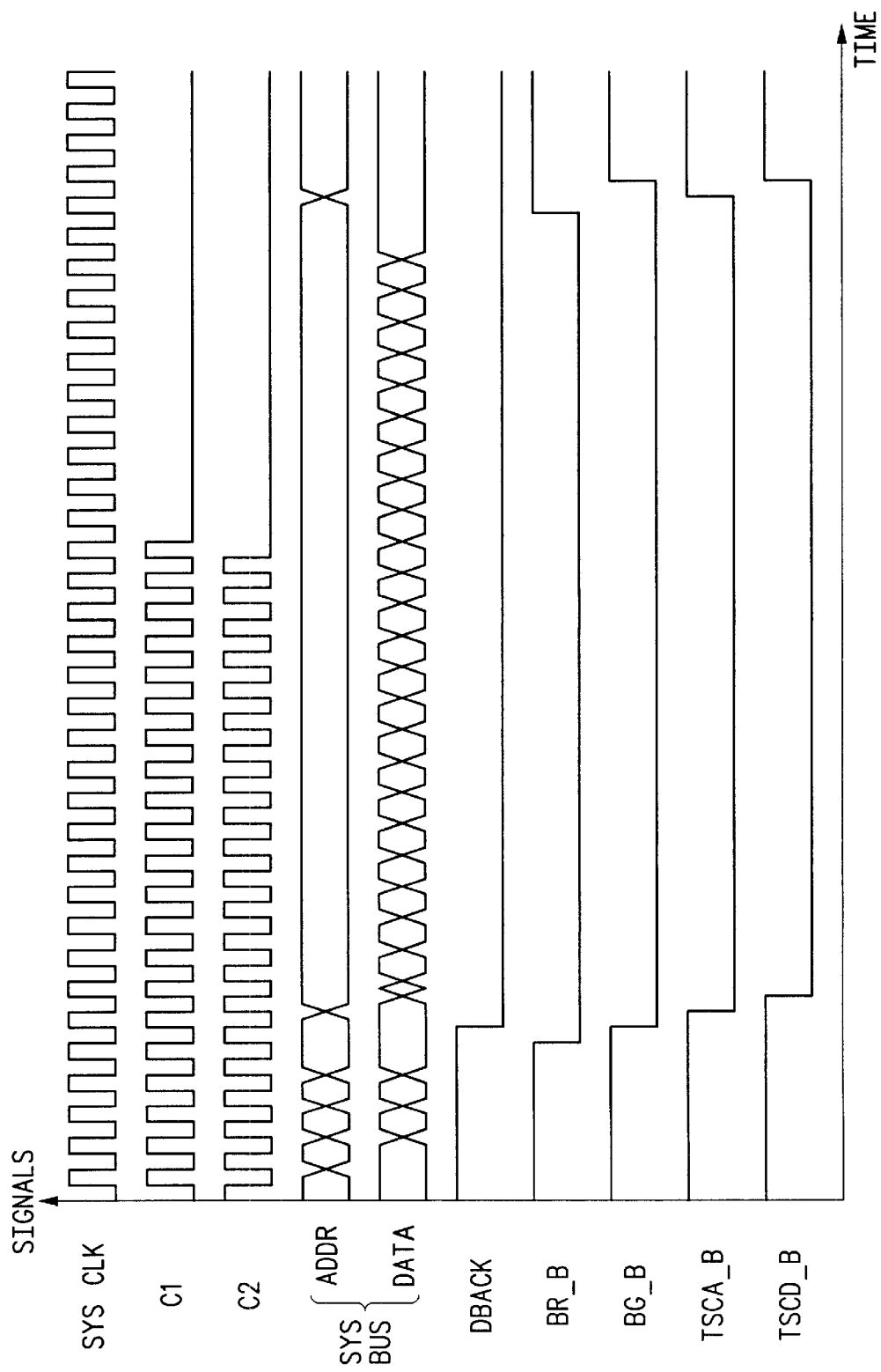
FIG. 7 is a timing diagram illustrating operation of the method of FIG. 4.

Turning now to FIGS. 4 and 7, a flow diagram and timing diagram are presented illustrating operation of system 200 permitting bus arbitration when processor 202 is in a debug state. Method 400 contemplates a method of debugging data processing system 200 by entering a debug state and thereafter enabling bus arbitration by the processor while the core remains in the debug state. Initially, processor 202 is operating in a normal operating state in block 404 of FIG. 4. In block 406, system 200 exists in the normal operating state and enters a debug state. This transition is indicated in the timing diagram of FIG. 7 by the assertion of the debug acknowledge (DBACK) signal. When processor 202 enters a debug state, debug unit 206 takes control of clock C1 and C2 via processor clock controller 210 and gracefully shuts the clocks down to prevent any glitching on the clocks in debug mode.

In block 408, the bus request signal BR_B is asserted and processor 202 enters an arbitration state. As with the low power state, the debug state and the arbitration state are not mutually exclusive in that processor 202 can enter the arbitration state while remaining in the debug state. The assertion of the bus request signal in block 408 results in the assertion in block 410 of the WAKE-UP signal by processor clock controller 210 to system control unit 222 of system clock unit 220 while processor 202 remains in the debug state. In response to the assertion of the BR_B and the WAKE_UP signal, arbiter 204 asserts the bus grant signal BG_B in block 412. In this manner, the WAKE-UP signal provided by processor clock controller 210 enables bus arbitration while processor core 212 remains in the debug state. After assertion of the bus grant signal BG_B, the tri-state control signals TSCA_B and TSCD_B are asserted to enable alternate master 230 to execute cycles on system bus 260 while processor 202 remains in the debug state. After alternate master 230 has completed its bus cycles in block 414, the alternate master 230 negates the bus request in block 416. The negation of the bus request signal BR_B in block 416 results in the negation of bus grant signal BG_B in block 418 causing processor 202 to exit the arbitration state. In block 420, the WAKE-UP signal is negated in response to the negation of the BG_B signal and system 200 is returned to the debug state. The transition from the arbitration state to the debug state preferably occurs without software intervention to minimize the transition period.

During the debug state, the processor clocks C1 and C2 are maintained in an off state in which both the C1 and C2 clock are low. Processor clocks C1 and C2 are preferably turned off in debug mode to allow access to core resources. These accesses of core resources must avoid clock synchronization hazards. In the absence of the arbitration facilities as described herein, processor would be unable to arbitrate external bus requests when processor 202 is in a debug state. Eventually, the debug state is exited in block 422 and normal operation state is reentered in block 424.

With reference to FIGS. 3, 6, 4 and 7, it will be appreciated by those skilled in the field having the benefit of this disclosure that the invention contemplates a method of operating data processing system 200 in which the data processing system is configured to hold the clocks in a first configuration in response to data processing system entering a first state such as the low power state described with respect to FIGS. 3 and 6 in which the SYS CLK, C1 clock, and C2 clock are all held in a static condition. In addition, processing system 200 is configured to hold the clocks in a second configuration when the system enters a second state such as the debug state described with respect to FIGS. 4 and 7, in which the processor core clocks C1 and C2 are held in an off state following expiration of a predetermined interval after entering the debug state.

It will therefore be appreciated by those skilled in the art having the benefit of this disclosure that the present invention contemplates a system and method for enabling arbitration of an external system bus independent of the operating state of the core processor. In addition, the facilities described herein optimize power consumption by disabling unnecessary circuitry when an alternate bus master controls the system bus. In the foregoing specification, the invention has been described with reference to specific embodiments. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention.

What is claimed is:

1. A method of conserving power in a data processing system, the data processing system including a processor and system circuitry coupled to the processor, the processor having a processor core and a processor clock controller coupled to the processor core, the method comprising:

entering a low power state by the processor and the system circuitry; and enabling bus arbitration by the processor while the processor core remains in the low power state, wherein enabling comprises:

the processor clock controller providing a processor clock for a first duration during which a bus grant signal is provided to the bus requesting device; and after the first duration, the processor clock controller holding the processor clock for a second duration during which the bus requesting device executes a bus operation.

2. The method of claim 1, wherein enabling bus arbitration is performed in response to receiving a request for bus access from a bus requesting device.

3. The method of claim 2, wherein the system circuitry comprises the bus requesting device.

4. The method of claim 2, wherein in response to receiving the request for bus access, the system circuitry and processor core enter an arbitration state while remaining in the low power state.

5. The method of claim 4, wherein the system circuitry comprises a system controller, and enabling bus arbitration comprises sending a first signal to the system controller.

6. The method of claim 5, further comprising:

in response to the first signal, exiting the low power state by the system circuitry to enable bus operations of the bus requesting device.

7. The method of claim 6, further comprising:

returning to the low power state by the system circuitry after completion of the bus operations, wherein returning to the low power state requires no software intervention.

8. The method of claim 1, further comprising:

exiting the low power state by the system circuitry to enable bus operations of the bus requesting device while the processor core remains in the low power state.

9. The method of claim 8, further comprising:

returning to the low power state by the system circuitry after completion of the bus operations.

10. The method of claim 9, wherein returning to the low power state by the system circuitry requires no software intervention.

11. A method of conserving power in a data processing system, the data processing system including a processor core and system circuitry coupled to the processor core, the method comprising:

granting bus access to a requesting device;

entering a power conservation mode by the processor core responsive to granting the bus access; and performing a bus operation while the processor core remains in the power conservation mode.

12. The method of claim 11, wherein the data processing system is an integrated circuit microprocessor and the requesting device as coupled to the integrated circuit microprocessor.

13. The method of claim 11, wherein prior to granting bus access, the data processing system exits a normal operating state and enters an arbitration state.

14. The method of claim 13, wherein after performing a bus operation the data processing system exits the arbitration state and enters the normal operating state.

15. A data processing system comprising:

a system clock controller coupled to provide a clock signal to a bus requesting device;

an arbitration unit; and a processor clock controller coupled to the arbitration unit, the system clock controller, and a processor core, the processor clock controller enabling a processor clock to allow the arbitration unit to provide a bus grant to the bus requesting device and disabling the processor clock after providing the bus grant while the bus requesting device performs a bus operation.

16. The data processing system of claim 15, wherein the bus requesting device performs the bus operation without the processor core leaving one of a low power state or a debug state.

17. The data processing system of claim 16, further comprising a low power unit coupled to provide low power state signals to the system clock controller.

18. The method of claim 1, wherein the first duration is only as long as necessary for providing the bus grant signal.

19. The method of claim 18, wherein enabling bus arbitration further comprises sending a first signal to the system controller.

20. The data processing system of claim 15, wherein the processor core enters a low power state in response to providing the bus grant.

21. The method of claim 11, wherein the processor core receives a processor core clock and entering the power conservation mode by the processor comprises halting a processor core clock.

22. The method of claim 21, wherein the system circuitry receives a system clock and the system clock remains enabled while performing the bus operation.

\* \* \* \* \*